Feb. 18, 1964     A. LORENZ     3,121,530
HIGH VACUUM PUMPS

Filed Aug. 10, 1960     6 Sheets-Sheet 1

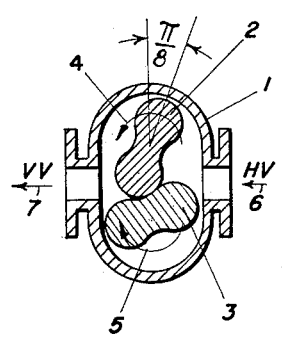 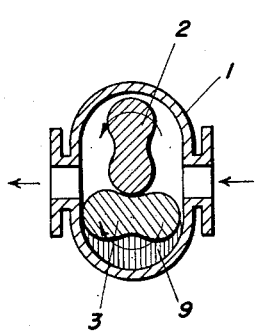 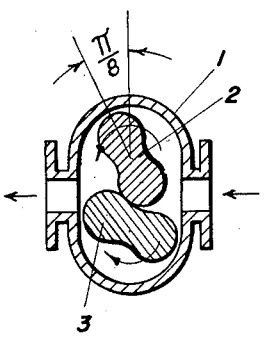
Fig. 4a    Fig. 4b    Fig. 4c
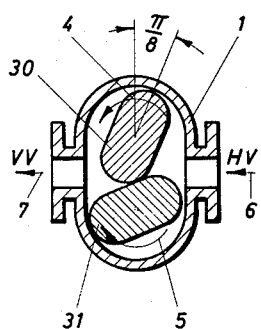 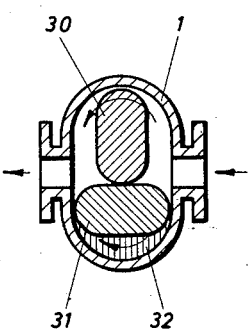 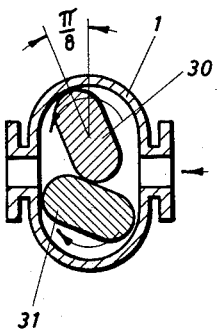
Fig. 6a    Fig. 6b    Fig. 6c

United States Patent Office 3,121,530
Patented Feb. 18, 1964

3,121,530
HIGH VACUUM PUMPS
Albert Lorenz, Hanau (Main), Germany, assignor to W. C. Heraeus G.m.b.H., Hanau (Main), Germany, a German body corporate
Filed Aug. 10, 1960, Ser. No. 48,619
Claims priority, application Germany Aug. 11, 1959
1 Claim. (Cl. 230—158)

The present invention relates to mechanical high vacuum pumps of the Roots blower type for employment in the zone of pressure below 20 torr, more particularly as high vacuum pumps. The term torr as used hereinabove is the expression for a unit of pressure and is accepted by the American Vacuum Society. In other words, "torr"=mm. Hg so that 20 torr means 20 mm. Hg pressure or vacuum.

The known Roots blowers belong to a large group of pumps for a purely volumetric delivery (i.e. without any essential compression during the delivery process) of gases and fluids, and having two rotors, which rotate on two parallel axes in mutually opposite directions and deliver into the intermediate space between the internal wall of the housing and the surface of the rotor, a given volume from the suction to the pressure side. Such pumps are much employed and are known with many different forms of rotor. In fact, such pumps were even described as far back in time as the 17th century, as will be referred to later.

Figure 8:
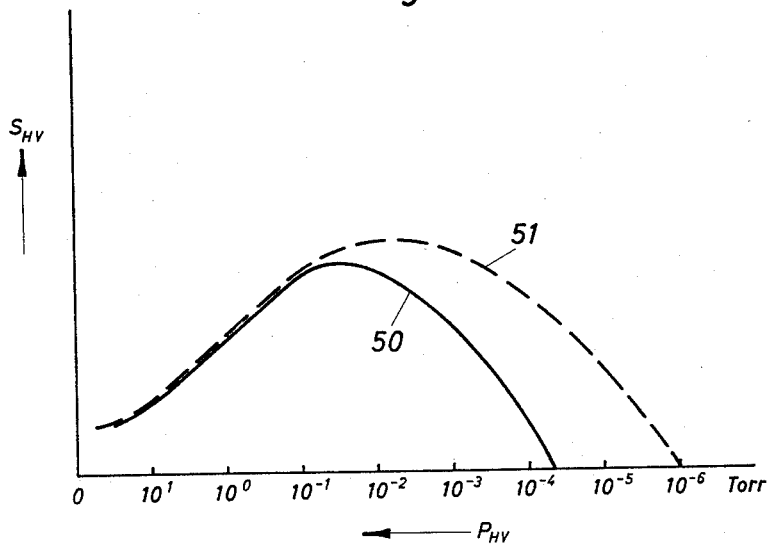

Since 1867, when the actual blower with two equal rotors of figure-8-cross-section (which was already invented earlier in this century), became generally known and named according to the second inventors P. H. and F. M. Roots, many modifications of these pumps have been and still are described.

Blowers having two axes have also not only been built with purely cylindrical rotors but also with rotors which are spirally rotated about their axes and a delivery along the axis of the pump and not only with the purely volumetric delivery referred to above, but also a compression could be obtained during the delivery process.

For a few years, Roots blowers with figure-8-cross-section cylindrical rotors have been used for vacuum purposes. Since the rotors have no mutual contact and have also no contact with the pump housing, they have narrow slots, and are therefore used together with one of the usual preliminary pumps in order to produce a vacuum which is to a large extent free of vapor. In this manner, vacua of $10^{-4}$ and even $10^{-5}$ mm. Hg, or torr total pressure have been obtained. The high speed possible enables, with relatively small external measurements, large volumetric delivery efficiencies to be obtained which enables the otherwise necessary large preliminary vacuum group requiring high power inputs to be replaced by substantially smaller preliminary pump and a pre-connected Roots high vacuum pump with on the whole substantially smaller input power.

The new Roots vacuum pumps were put on the market only a very short time after their initial appearance owing to their great advantages. They have a good delivery efficiency, but they have one drawback which noticeably restricts their use as highest vacuum pumps. This disadvantage consists in that their output drops at one point of the delivery efficiency characteristic which is at substantially higher pressures than should be expected in theory.

This drawback is substantially removed or minimized in a surprisingly simple manner, by means of the present invention.

According to the invention, the cross-sectional shape of the two rotors of a mechanical vacuum pump of the Roots blower type employs a preliminary pump having a pressure zone below 22 mm. Hg connected thereto, is in the form of two substantially mutually convex end portions joined by two mutually parallel straight sides. This form of rotors was known, but up to this time was not used for vacuum purposes.

Alternatively the cross-sectional shape may be referred to as rectangular but with each corner curved off to a quadrant shape.

Roots type vacuum pumps according to the invention have a delivery efficiency curve, which falls off at substantially smaller pressures than the curve of pumps with the rotors hitherto used exclusively for vacuum purposes. The more precise tests showed that the early drop of the delivery capacity curve is caused essentially by a return of quantities of gas which are already conveyed and are situated at a higher pressure, between the two figure 8-shaped rotors.

In order that the invention may be more readily understood, reference will now be made to the accompanying drawings, which show one specific example thereof, as compared with pumps as hitherto known, and in which:

FIGURES 1a to 1i show cross-sections through various pumps as used over many years.

Figure 1A:
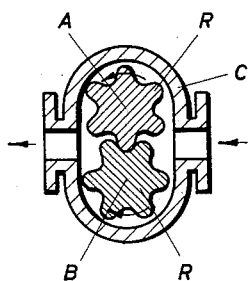
Figure 1B:
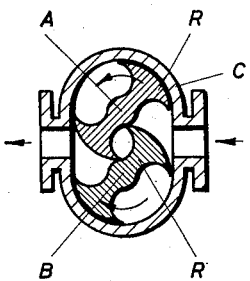
Figure 1C:
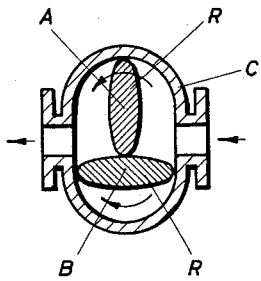
Figure 1D:
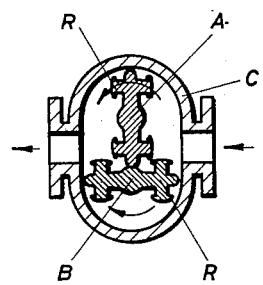
Figure 1E:
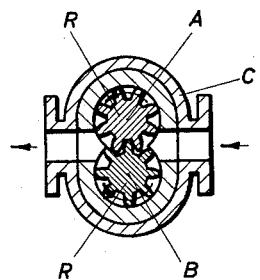
Figure 1F:
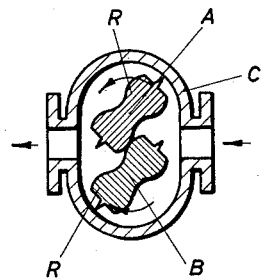
Figure 1G:
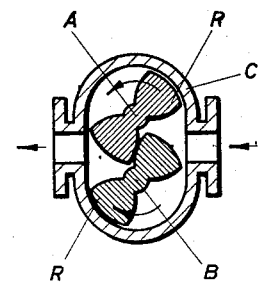
Figure 1H:
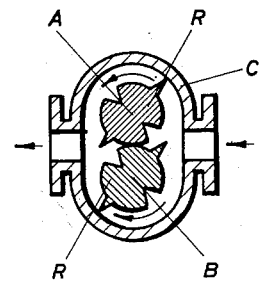
Figure 1I:
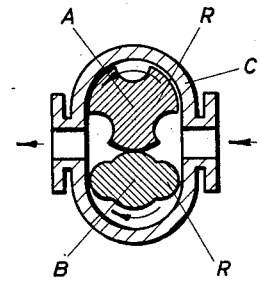
Figure 2:
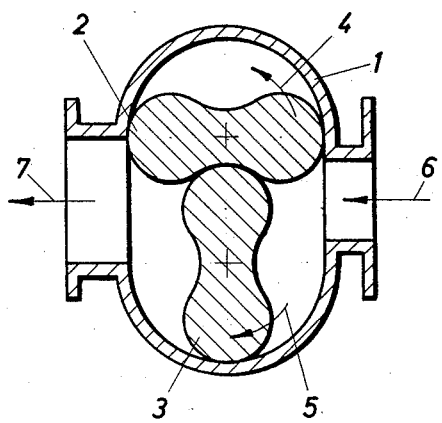
Figure 3:
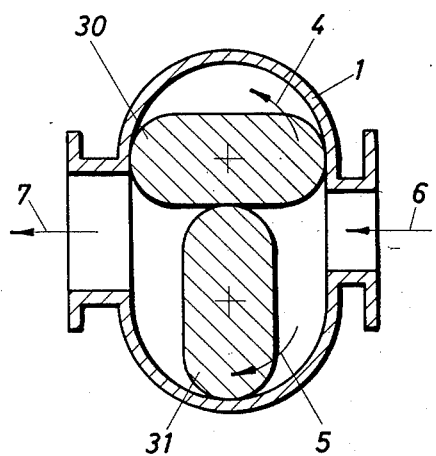

FIGURE 2 shows a cross-section of a Roots blower as hitherto exclusively used for vacuum purposes, FIGURE 3 shows a cross-section through a pair of rotors according to the invention, in a pump chamber, FIGURE 4a, 4b and 4c show cross-sections of the pump of FIGURE 2, with the rotors in different relative positions, FIGURES 5a to 5f show adjacent portions of the two rotors of the pump of FIG. 2, in five different but closely adjacent positions, FIGURES 6a, 6b and 6c show cross-sections of the pump rotors according to the invention, in different relative positions corresponding to those of FIGURES 4a, 4b and 4c.

Figure 9:
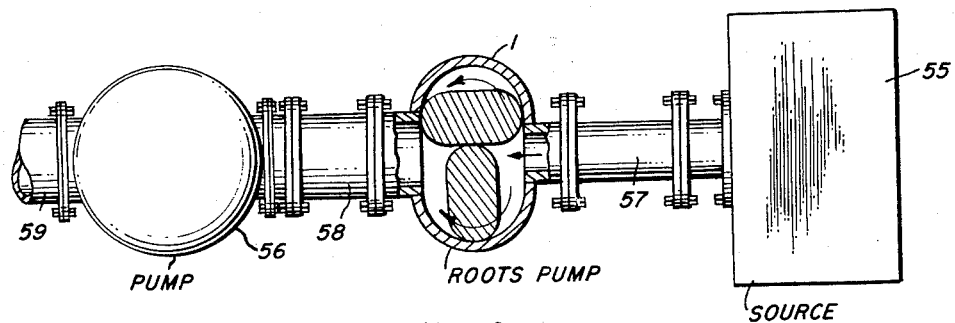

FIGURES 7a to 7f show adjacent portions of the two rotors shaped according to the invention, in five different but closely adjacent positions, corresponding to those of FIGURES 5a to 5f, FIGURE 8 shows a pair of delivery efficiency curves of a pump of a kind as shown in FIGURE 2 and of a pump using rotors according to the invention (FIGURE 3), and FIGURE 9 is a longitudinal sectional view showing the arrangement of the embodiment of the invention in series connection with a source to be evacuated and an ordinary type of pump, known in the art.

Referring now to the drawings, FIGURES 1a to 1i show cross-sections of various pumps which have been used for a great number of years. That shown in FIGURE 1a was illustrated in "Machina Pappenheimiana" in the 17th century, and has six-bladed rotors R mounted to rotate on axes A and B in a pump chamber C: the inlet and outlets being indicated by the arrows. FIGURES 1b to 1i show pumps having rotors of various cross-sections constituting modifications of those attributed to Roots in 1867. For purposes of simplification, all these modifications have been given the same reference numerals. The direction of rotation of the rotors is also indicated by arrows. Their showing is only intended to point out the history of the development of this kind of pump. Besides the cross-sections given in the FIGURES 1a to 1i there are used the form with figure-8-rotors as later shown in FIGURE 2 and with partially parallel sides as later shown in FIGURE 3, the use of this latter form for vacuum purposes forming the subject matter of the invention.

FIGURE 2 shows a cross-section through a high vacuum pump of the Roots type, embodying the conventional figure-8-cross-section rotors. The pump chamber or housing is shown at 1 and the rotors at 2 and 3 respectively, which rotate in the direction of the arrows 4 and 5.

FIGURE 3 shows a cross-section through a high vacuum pump of the Roots type, using rotors having a cross-section according to the invention. The pump chamber or housing has also been given the reference numeral 1 as it is no different from the conventional chamber or housing shown in FIGURE 2. The rotors are shown at 30 and 31 and rotate in the same relative directions as those of FIGURE 2 and have therefore also been shown by arrows 4 and 5. In both FIGURES 2 and 3, the inlets and outlets are indicated by the straight arrows 6 and 7. It is to be noted that inlet 6 is connected to a source to be evacuated. The relative movements of the rotors 2 and 3 and 30 and 31 respectively are synchronized by gear drives which are conventional and well known to those skilled in the art and have therefore not been shown in the drawings.

Referring now more particularly to FIGURES 4a, 4b and 4c, gas is conveyed in the direction of the arrows 6 and 7 from the high vacuum side HV to the pre-vacuum side VV. The figure-8-shaped rotors form together with the internal wall of the housing 1 a delivery or conveying chamber 9 whose volume, with a rotation through 360°, was conveyed four times from the high vacuum side to the pre-vacuum side. After being sealed from the high vacuum side the chamber 9 is filled with gas which is at the high vacuum pressure. This volume is brought to the pre-vacuum side and after opening towards the pre-vacuum side is raised to the higher pre-vacuum pressure by inflowing gas. During the actual delivery no compression occurs, the delivery is therefore purely volumetric. In the usual employment of such blowers at atmospheric pressure the pressure ratio between the pre-vacuum side and high vacuum side of the pump, i.e. the "compression ratio" produced, is relatively small. It corresponds with the usual employment at higher pressures at the most to approximately $$\frac{p_{VV}}{p_{HV}} \sim 1.3 \div 1.5$$

In the utilization as a high vacuum pump it is very much larger and the ratio is up to approximately 100.

Therefore only about a hundredth part of the geometrical volume 9 flows back from the pre-vacuum side to the high vacuum side, and therefore the delivery of the pump is compensated.

In FIGURES 4a, b and c, three positions of a Roots high vacuum pump of the form which was hitherto exclusively used is shown, which show the relation during a rotation of $\pi/4 = 45°$. They show clearly how the rotors move externally in the direction of gas delivery. The movement arrows 4, 5 shown have the same direction as the gas delivery, which is in the direction of the arrows 6, 7. However, approximately in the center of the pump housing the part of the rotor 2 which is far from the wall moves against the direction of gas delivery. Here there is therefore a great danger that gas will be driven along against the direction of delivery 6, 7.

In order to show the effects occurring, three intermediate positions between the FIGURES 4a and b are shown in FIGURES 5a to 5e. In this connection only the contact area of the rotors is shown which consist of curves in the same direction. The angular difference between the FIGURES 4a and b corresponds to $\pi/8$ and therefore the angular difference between the five individual partial representations of FIGURE 5 corresponds to the very small angle $\pi/32$. For the following it is important to get a clear idea of the time difference between the rotor positions shown in the drawing.

Owing to the lack of sliding friction, the easily obtainable excellent balance, the small absolute difference of pressure ($p_{VV} - p_{HV}$) on the pump and mainly owing to the desired large delivery efficiency Roots high vacuum pumps generally run at a speed of approximately 3000 revolutions per minute. One revolution therefore occurs in $2.10^{-2}$ seconds. And the time which passes between each two positions shown in FIGURES 5a to e therefore amounts to $$\tau = \frac{2.10^{-2}}{2.32} \sim 3.10^{-4} \text{ sec.}$$

FIGURE 5 is based on a Roots high vacuum pump in which the distance between the axes of rotation amount to 4.5 centimeters, the largest diameter of the rotors amounts to 8 centimeters and the smallest amounts to 2 centimeters. The point 10 of a rotor farthest from the axis moves at 3000 revolutions per minute at a speed of approximately 3100 centimeters/ second, and the point 1 nearest to the axis at approximately 600 centimeters/ second.

The points 13 and 14 shown with arrows have somewhat larger speeds of rotation. They move on circles about the centers 15 or 16 or the rotor cross-sections. Between them there is a narrow intermediate space 17, which during the rotation from the position according to 5a to that according to 5e becomes longer and narrower and is at the higher pre-vacuum pressure. The molecules found here no longer have sufficient time during the rotation to come out to the pre-vacuum side. The study of the movement of the points 13 (curve 18) and 14 (curve 19) is once again more clearly shown in FIGURE 5f. It can be seen clearly here how the curve 19, without fundamental alteration of direction of the surface of the rotor 3, approaches the curve 18 and in the short time therebetween forces many of the molecules present there to go into the narrow slot 17 and to go aolng with the surface of the rotor 2 which moves rapidly towards the high vacuum side. A substantial number, and even perhaps the majority of the molecules present in the slot 17 therefore arrive on the high vacuum side, where a pressure prevails which is smaller by several orders of magnitude. Therefore only a small volume, which is at pre-vacuum pressure or higher pressure, arriving at the high vacuum side, where a substantially lower pressure prevails, expands to a multiple of its initial volume and can compensate the efficiency of the pump to a great extent or even completely. This fact forming a serious draw-back in the vacuum field is the starting point of the invention.

By drawing off these molecules carried forward on the high vacuum side, through a special system of tubes connected for instance at point 10, it is possible to obtain a certain relief but this method is very costly from the point of view of manufacturing technique.

The construction of a Roots type vacuum pump with rotors according to the invention is shown more particularly in FIGURES 6a, b and c in three different positions. In the housing 1 the two rotors 30 and 31 rotate in the direction of the arrows 4 and 5. The delivery volume 32 is somewhat smaller but this does not represent any substantial drawback, according to the subsequent representation. These positions which are shown in FIGURES 6a to c correspond to those of FIGURES 4a to c with an angle of rotation of altogether $\pi/4$.

FIGURES 7a to e correspond to FIGURES 5a to e; the time between the represented rotor positions is again $\tau \sim 3 \cdot 10^{-4}$ seconds.

Figure 5A:
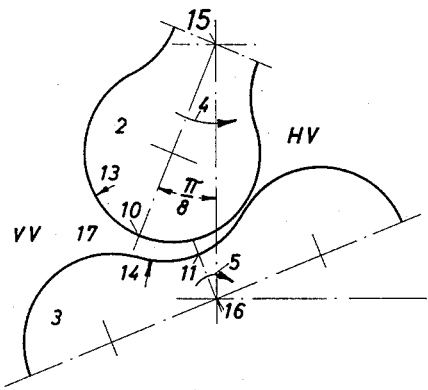
Figure 5B:
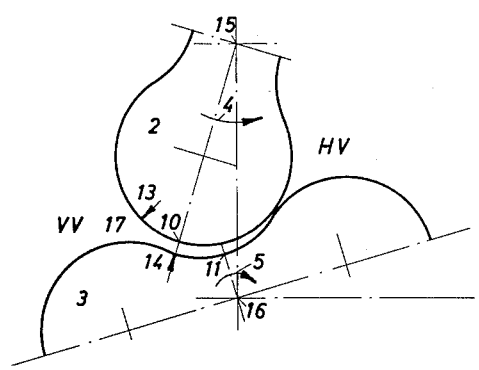
Figure 5C:
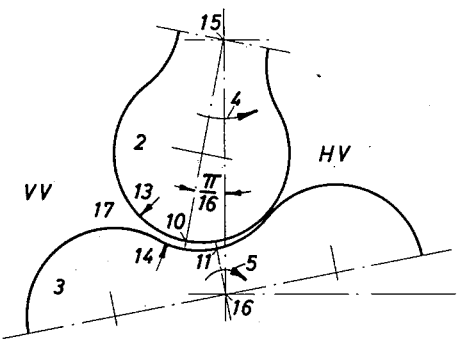
Figure 5D:
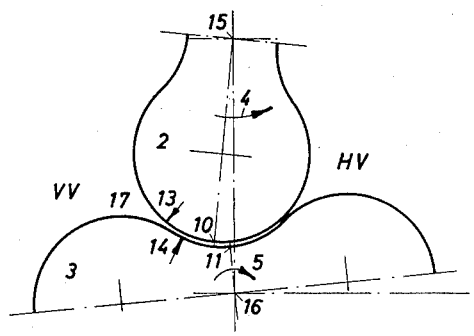
Figure 5E:
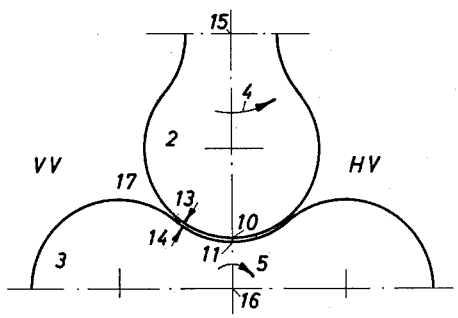
Figure 5F:
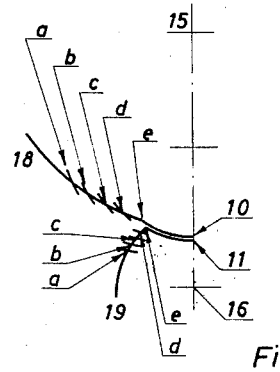
Figure 7A:
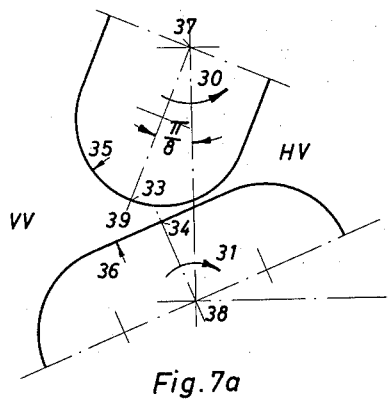
Figure 7B:
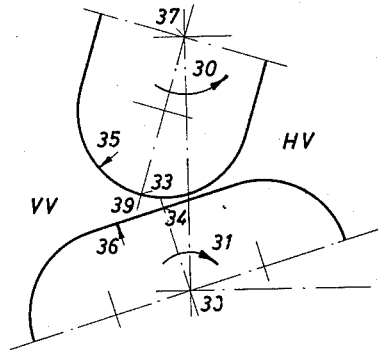
Figure 7C:
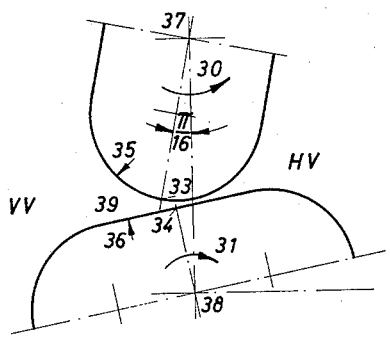
Figure 7D:
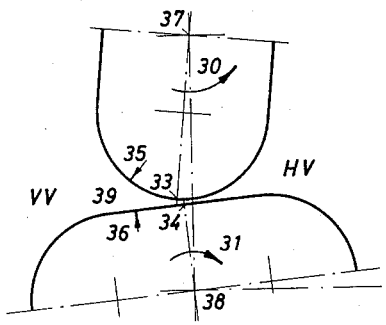
Figure 7E:
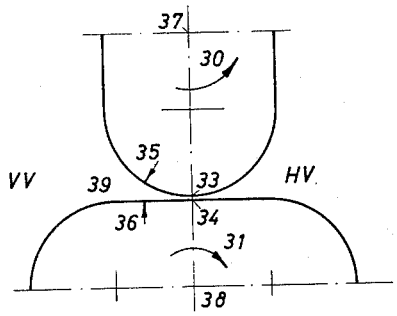
Figure 7F:
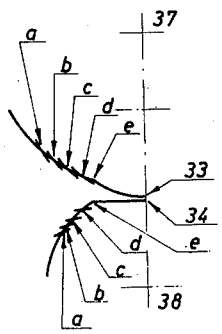

From these drawings it may be clearly seen that the slot 39 on the pre-vacuum side becomes in no case as narrow as the long narrow closing slot 17 in FIGURES 5a to c. It is always connected with the pre-vacuum space and thus enables a return diffusion of gas molecules situated in the slot 39, without them being carried forward by a very rapid closing at the high vacuum side.

This is only possible by the fact that the opposite surface parts of the rotary pistons have no unidirectional curve. This knowledge hitherto not noticed is the essential basis of the present invention.

The rotor form according to the invention used for vacuum purposes with two opposite parallel sides has moreover the advantage that it is very simply manufactured. The plane surface portions are planed, milled or ground parallel in a known manner; no difficulties whatever being encountered in manufacturing them. The convexly curved end surface portions roll and slide during the operation on a plane surface portion of the other rotor. It will thus be seen that they may be manufactured by means of a plane grinding disc and simple kinematics which are known to those skilled in the art and therefore are not shown in the attached figures. The advantage in the method of manufacture involves not only an essential reduction in cost but also that the rotors may be manufactured very precisely without great difficulty. The consequence of this is that in the finished pumps the slots which are always necessary between the rotating or fixed parts may be much narrower and therefore the delivery efficiency curve is more favorable than in the forms of rotor which were hitherto exclusively used for vacuum purposes (FIGURE 2).

It was indicated above that the rotors according to the invention, in FIGURES 6a to c give a smaller delivery volume 32 than the hitherto used, according to FIGURES 4a to c. However, this is only of secondary importance because this loss may again be compensated by a small increase of the revolution speed or of the pump measurements. For the working of the pump and its heating the total delivery efficiency and not the individual delivery volume is decisive. The power delivered from the motor to the pump is nearly completely transformed into heat. This means that for a delivery efficiency of $am^3/h$ an output of $b$ kilowatts is necessary which however is not a function of the speed or of the pump measurements.

This smaller delivery volume 32 of the proposed rotor cross-section according to FIGURE 3 was also the reason for which the form of rotor according to FIGURE 2 was hitherto exclusively used for generating a vacuum. The apparent advantage is very obvious for an observer of the two forms of rotor (FIGURE 2 and FIGURE 3). And since in vacuum pumps it is desired to have a volumetric delivery efficiency which is as large as possible, the form of rotor according to the invention (FIGURE 3) appears to have a substantial drawback. Verification has however resulted in a decision in favor of the form of rotor according to the invention (FIGURE 3) in the case when the Roots vacuum pump is intended to produce a high vacuum which is extremely good.

In FIG. 9, it will be noted that the type of pump, such as shown in FIG. 3 or FIGS. 6a–c, covered by the present invention, is in series connection with a source 55 to be evacuated and another pump 56 of the usual type by means of conduits 57 and 58 respectively. Conduit 59 leads either to the atmosphere or to another suitable connection for further evacuation as desired.

FIGURE 8 shows curves of delivery efficiency for a pump with the figure-8-shaped rotors which were hitherto the only usual ones (curve 50) and for a pump with rotors according to the invention (curve 51). Both pumps have the same speed, the same delivery volume and practically the same clearance between the rotors and housing. The preliminary pump used in both pumps has a purely geometrical delivery efficiency which is ten times smaller.

The measured suction capacity S in arbitrary units ($m^3/h$) is a function of the suction pressure $p_{HV}$. Down to approximately $5 \cdot 10^{-2}$ torr, or mm. Hg the suction capacity of both pumps is nearly exactly the same. Below $5 \cdot 10^{-2}$ torr, or mm. Hg the curve 50 of the usual pumps drops very rapidly. The final vacuum is in this connection somewhat better than $10^{-4}$ torr, or mm. Hg.

In Roots pump using rotors according to the invention, the suction capacity (curve 51) increases still further below $5 \cdot 10^{-2}$ torr, or mm. Hg and therefore the compression ratio becomes very large. The drop occurs only much later and the final vacuum aimed at is better by more than ten times. The vacuum which may be obtained in practice in a vessel being evacuated rises by this amount, the larger value of the suction capacity being an important safety factor for obtaining the vacuum mentioned. The pump with the rotors according to the invention therefore not only attains a better vacuum but reaches it with a greater certainty which is scarcely diminished by gas outflow in the vessel being evacuated.

These very important advantages of the rotor cross-section here proposed for vacuum purposes, hitherto have not been noticed, though the cross-section itself was already known. The invention is based on creative perceptions which could be gained only by an extensive analysis of the working mechanism of the Roots type pump at the highest attainable vacuum and of the drawback consisting in a pumping speed at such pressure being less than it should be expected.

The curves have been obtained with a geometrical delivery ratio of 10:1 between the Roots pump and the preliminary pump. It is known that the suction capactiy curves depend to a large extent on this delivery ratio. A Roots pump using rotors according to the invention (curve 51) possesses a larger compression ratio, so that the selection of the preliminary pump is therefore less critical. The preliminary pump may also be smaller without any substantial influence on the suction capacity curve. This again gives rise to a saving in costs.

The processes during pumping which were explained above in detail ensure that the smaller return delivery is produced by the slot which is always wide open towards the pre-vacuum side, between the rotor surfaces. However, not only rotors with a partial plane surface have such favorable slots. The same is also the case in oval rotors (for example FIGURE 1c). The only condition is that the two rotors have no unidirectional curve (see FIGURE 4 and FIGURE 5) or in other words, possess no indentation with negative curving ratio at any point of the surface.

I claim:

A vacuum pump set having a first pump, said first pump having two flat intermeshing rotors, each of said rotors having a cross sectional shape of two convex end portions joined by two mutually parallel straight sides, said first pump having an inlet connected to a source to be evacuated and having an outlet, a second pump constructed and arranged to generate a vacuum below 20 mm. Hg, and having an inlet and an outlet, said outlet of said first pump being connected to the inlet of the second pump.

References Cited in the file of this patent

UNITED STATES PATENTS

| 15,280 | Clow | July 8, 1856 |
| 2,115,325 | Behringer | Apr. 26, 1938 |
| 2,492,075 | Van Atta | Dec. 20, 1949 |
| 2,721,694 | Van Atta | Oct. 25, 1955 |

FOREIGN PATENTS

| 834,197 | France | Aug. 8, 1938 |
| 846,897 | France | June 19, 1939 |

OTHER REFERENCES

High Vacuum Technique, by J. Yarwood (1955).
Vacuum Technique, by Arnold Reinmann (1952).
High Vacuum, by Saul Dushman (1922).
Marks Mechanical Engineers' Handbook, Sixth Edition (1958).